(12) United States Patent
Beppu

(10) Patent No.: US 9,139,151 B2
(45) Date of Patent: Sep. 22, 2015

(54) AIRBAG DEVICE

(71) Applicant: Autoliv Development AB, Vårgårda (SE)

(72) Inventor: Yoshinori Beppu, Yokohama (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 14/389,412

(22) PCT Filed: Mar. 15, 2013

(86) PCT No.: PCT/JP2013/057389
§ 371 (c)(1),
(2) Date: Sep. 30, 2014

(87) PCT Pub. No.: WO2013/146345
PCT Pub. Date: Oct. 3, 2013

(65) Prior Publication Data
US 2015/0054266 A1      Feb. 26, 2015

(30) Foreign Application Priority Data

Mar. 30, 2012   (JP) .................................. 2012-080502

(51) Int. Cl.
*B60R 21/20* (2011.01)
*B60R 21/213* (2011.01)
*B60R 21/215* (2011.01)

(52) U.S. Cl.
CPC ............. *B60R 21/213* (2013.01); *B60R 21/215* (2013.01)

(58) Field of Classification Search
CPC .... B60R 21/201; B60R 21/213; B60R 21/215
USPC .......................................... 280/728.2, 730.2
See application file for complete search history.

(56) References Cited

U.S. PATENT DOCUMENTS

| | | | |
|---|---|---|---|
| 8,573,638 B2 * | 11/2013 | Hayashi et al. | 280/730.2 |
| 2005/0057023 A1 * | 3/2005 | Burton et al. | 280/730.2 |
| 2007/0090630 A1 * | 4/2007 | Wilmot | 280/728.2 |
| 2008/0224452 A1 | 9/2008 | Kino et al. | |
| 2009/0273167 A1 * | 11/2009 | Katagiri | 280/730.2 |
| 2009/0309339 A1 * | 12/2009 | Massot et al. | 280/730.2 |
| 2010/0127484 A1 * | 5/2010 | Son | 280/730.2 |
| 2011/0057422 A1 * | 3/2011 | Cheal et al. | 280/728.2 |

FOREIGN PATENT DOCUMENTS

| | | |
|---|---|---|
| DE | 10 2008 006 133 A1 | 8/2008 |
| JP | 10-329634 A | 12/1998 |
| JP | 2008-184056 A | 8/2008 |
| JP | 2008-239082 A | 10/2008 |
| JP | 2011-031640 A | 2/2011 |

OTHER PUBLICATIONS

Japanese Patent Office, International Search Report of International Application No. PCT/JP2013/057389, Mailed on Jun. 25, 2013 (3 pages).

\* cited by examiner

*Primary Examiner* — Paul N Dickson
*Assistant Examiner* — Robert A Coker
(74) *Attorney, Agent, or Firm* — Brinks Gilson & Lione

(57) ABSTRACT

This airbag device includes a first protective cover and a second protective cover which store and protect an airbag. The airbag has a tab formed between the first protective cover and the second protective cover so as to protrude outward approximately in parallel with a longitudinal direction of the airbag. The tab has one end connected to the first protective cover and the other end connected to the second protective cover.

17 Claims, 4 Drawing Sheets

AIRBAG DEVICE

BACKGROUND

1. Field of the Invention

The present invention relates to an airbag device attached to a roof side rail of a vehicle.

2. Description of Related Art

A vehicle airbag device in which an airbag is deployed in a curtain form from a roof side rail of the vehicle in order to prevent the head portion of an occupant from colliding with a side window or the like in the event of a side crash is known. Such an airbag device is also referred to as a curtain airbag device.

In a curtain airbag device, an airbag is folded in a long and thin manner and is stored in a protective cover that is attached to a roof side rail of a vehicle. Airbags and protective covers are often disposed along the entire roof side rail in a front-rear direction of a vehicle in order to protect an occupant on a rear seat as well as an occupant on a front seat.

As a result, since the entire protective cover is long, it is not desirable to form the protective cover as an integral body when transportation or the like before attachment to a vehicle is taken into consideration. Thus, Japanese Patent Application Publication No. 2011-31640 proposes an airbag device in which a protective cover is divided along a longitudinal direction into a plurality of parts so that the protective cover can be bent in a compact form.

In an airbag device in which a protective cover is divided, an airbag folded in a long and thin manner is stored and protected by a plurality of protective covers disposed in line in a longitudinal direction of the airbag.

In general, an airbag is formed from a fabric or the like that can be deformed flexibly. Thus, before an airbag device is attached to a vehicle, the respective protective covers may rotate about the longitudinal direction of the airbag and the airbag stored therein may be twisted. That is, the respective protective covers may be attached to a vehicle in a state where the airbag stored therein is twisted erroneously.

If protective covers are attached to a vehicle in a state where the airbag is twisted, the airbag may not be deployed properly between an occupant and a side window or the like in the event of a crash and may be unable to protect the occupant. Besides this, a dangerous situation may occur.

Thus, in the airbag device disclosed in Japanese Patent Application Publication No. 2011-31640, a connecting mechanism that connects adjacent two protective covers so that the protective covers cannot rotate in relation to each other is provided in an end of each protective cover.

SUMMARY

In the airbag device disclosed in Japanese Patent Application Publication No. 2011-31640, a male engagement portion is formed in an end of one of adjacent protective covers and a female engagement portion is formed in an end of the other protective cover so that the male engagement portion engages with the female engagement portion. As a result, the protective covers are restricted from rotating (twisting) about the longitudinal direction of the airbag in relation to each other while allowing the protective covers to be bent at the connecting portions.

However, since it is necessary to form a complex male or female engagement portion in the end of each protective cover and to engage the engagement portions, the steps for manufacturing the protective covers become complex. Moreover, although a connecting mechanism may be manufactured as a separate component and be attached to the end of the protective cover, the number of components may increase, which may increase the manufacturing cost.

In view of such a problem, an object of the present invention is to provide an airbag device having a simple and inexpensive structure, capable of preventing the occurrence of a state where a plurality of protective covers rotates in relation to each other about a longitudinal direction of an airbag and the airbag is twisted.

In order to solve the problem, the present invention provides an airbag device attached to a roof side rail of a vehicle, including: an airbag that is folded in a long and thin manner; a first protective cover that stores a part of the airbag; and a second protective cover arranged so as to be disposed in line with the first protective cover in a longitudinal direction of the airbag and storing a part of the airbag, wherein the airbag has a tab that is formed between the first and second protective covers so as to protrude outward approximately in parallel with the longitudinal direction of the airbag, and the tab has one end connected to the first protective cover and the other end connected to the second protective cover.

In the present invention, the tab is formed in the airbag between the first and second protective covers disposed in line in the longitudinal direction of the airbag. The tab is formed so as to protrude outward approximately in parallel with the longitudinal direction of the airbag, and one end thereof is connected to the first protective cover and the other end is connected to the second protective cover.

That is, the first and second protective covers that are adjacent to each other are not connected directly to each other but are connected by the tab formed in a part of the airbag. In this state, when trying to rotate (twist) only one of the first and second protective covers about the longitudinal direction of the airbag, both ends of the tab are stretched, whereby rotation is suppressed.

Moreover, when trying to rotate the protective cover excessively against the suppression, since the direction of the tab will not be approximately in parallel with the longitudinal direction of the airbag, it is possible to easily perceive from the outside that the airbag is twisted therein. Due to this, it is possible to reliably prevent the first and second protective covers from being attached to the vehicle in a state where the airbag is twisted.

In the airbag device according to the present invention, a first hook portion may preferably be formed in an end of the first protective cover close to the tab, a second hook portion may preferably be formed in an end of the second protective cover close to the tab, the tab may preferably be connected to the first protective cover by the first hook portion being inserted into a first insertion hole formed in one end of the tab, and the tab may preferably be connected to the second protective cover by the second hook portion being inserted into a second insertion hole formed in the other end of the tab.

In this preferred embodiment, the tab and the first protective cover, and the tab and the second protective cover are connected by inserting the hook portion formed in the first protective cover and the like into the insertion hole formed in the tab. That is, the first hook portion is formed in the end of the first protective cover close to the tab and the second hook portion is formed in the end of the second protective cover close to the tab. Then, these first and second hook portions are inserted into the first and second insertion holes formed in both ends of the tab, respectively.

In this manner, it is possible to connect the tab and the first protective cover and the like with a simple structure including the first and second hook portions and the insertion holes formed in the tab and to prevent the protective covers from being attached to the vehicle in a state where the airbag is twisted. Moreover, it is possible to facilitate the operation of connecting the tab and the first protective cover and the like.

In the airbag device according to the present invention, a distance between the first and second insertion holes of the tab may preferably be approximately the same as a distance between the first and second hook portions in a state where the airbag device is attached to the roof side rail of the vehicle.

In this preferred embodiment, the first and second insertion holes are formed so that the distance between the first and second insertion holes of the tab is approximately the same as the distance between the first and second hook portions in a state where the airbag device is attached to the roof side rail of the vehicle.

Due to this, in a state where the airbag device is attached to the roof side rail of the vehicle, deflection may not occur in the tab of which both ends are connected to the first and second hook portions. As a result, it is impossible to rotate only one of the first and second protective covers about the longitudinal direction of the airbag. Due to this, it is possible to reliably prevent the first and second protective covers from being attached to the vehicle in a state where the airbag is twisted.

In the airbag device according to the present invention, the first and second protective covers may preferably be made from a resin.

In this preferred embodiment, since the first and second protective covers are made from a resin, it becomes easier to form the first and second hook portions.

In the airbag device according to the present invention, it is preferable that the tab be a fabric and one side of the tab be sewn to the airbag.

In this preferred embodiment, the tab for connecting the first and second protective covers can be easily formed in the airbag. Moreover, since the tab is freely deformed, the tab will not become an obstacle when the connecting portion of the first and second protective covers is bent.

In the airbag device according to the present invention, a first frame may preferably be attached to an edge of the first insertion hole and a second frame may preferably be attached to an edge of the second insertion hole.

In this preferred embodiment, the shape of the first and second insertion holes formed in the tab which is a fabric is fixed and maintained by the first and second frames. Due to this, it is possible to facilitate, for example, the operation of inserting the first hook portion into the first insertion hole. Moreover, since the edge of the first insertion hole is reinforced by the first frame, the first hook portion is prevented from being removed from the first insertion hole. Similarly, since the edge of the second insertion hole is reinforced by the second frame, the second hook portion is prevented from being removed from the second insertion hole.

According to the present invention, it is possible to provide an airbag device having a simple and inexpensive structure, capable of preventing the occurrence of a state where a plurality of protective covers rotates in relation to each other about a longitudinal direction of an airbag and the airbag is twisted.

DETAILED DESCRIPTION

Figure 1:
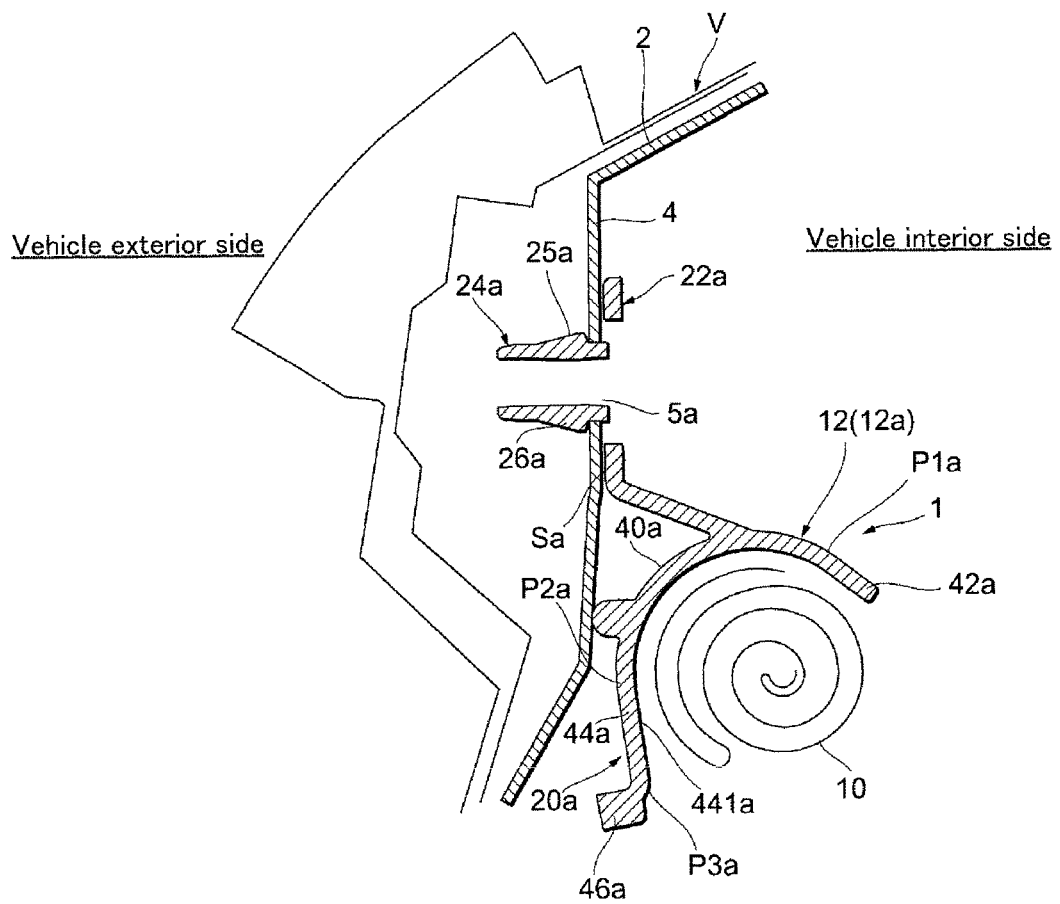
FIG. 1 is a cross-sectional view illustrating a state where an airbag device according to an embodiment incorporating the principles of the present invention is attached to a vehicle.

Hereinafter, an embodiment of the present invention will be described with reference to accompanying drawings. For better understanding of the description, the same constituent components in the respective drawings will be denoted by the same reference numerals as much as possible, and redundant description thereof will not be provided.

An airbag device according to an embodiment of the present invention will be described with reference to FIG. 1. FIG. 1 is a cross-sectional view illustrating a state where an airbag device 1 according to an embodiment of the present invention is attached to a vehicle V. FIG. 1 illustrates a cross-section when the airbag device 1 in a state of being attached to a roof side rail 2 of the vehicle V is cut along a plane vertical to a front-rear direction of the vehicle V. The roof side rail 2 is configured to form a closed cross-section by welding a plurality of panel members and the airbag device 1 is attached to an inner panel 4 which is one vehicle-interior-side panel member of the panel members.

As illustrated in FIG. 1, the airbag device 1 includes an airbag 10 which is folded in a roll form and in a long and thin manner and a protective cover 12 that stores and protects the airbag 10. Further, the airbag device 1 includes an inflator (not illustrated) that supplies inflation gas to the airbag 10.

The airbag 10 is formed in a bag shape by sewing a woven fabric or the like at appropriate positions and is deployed from a folded state to a deployed state when the inflation gas is supplied. The airbag 10 in the folded state has a long shape and is wrapped up and stored in the protective cover 12. The airbag 10 in the folded state may have a roll shape as illustrated in FIG. 1 and may have an accordion shape or a combination thereof. The airbag 10 is deployed downward from the roof side rail 2 in a curtain shape along a side window or the like so that the head portion of an occupant is protected during side collision of the vehicle V.

The protective cover 12 is disposed in the longitudinal direction of the airbag 10 so as to store the entire airbag 10. The protective cover 12 is not formed as an integral body but has a structure that is divided into two parts in the longitudinal direction. That is, the protective cover 12 includes a first protective cover 12a disposed on the vehicle front side and a second protective cover 12b disposed on the vehicle rear side.

The first and second protective covers 12a and 12b have a long shape and the cross-sectional shapes in the plane vertical to the longitudinal direction are approximately the same. The first and second protective covers 12a and 12b are disposed in the vehicle interior side along the inner panel 4 as illustrated in FIG. 1 so that the longitudinal directions thereof are approximately identical (in FIG. 1, the cross-sectional shape of the first protective cover 12a is illustrated). The first protective cover 12a stores a vehicle-front-side part of the airbag 10 and protects. The second protective cover 12b stores a vehicle-rear-side part of the airbag 10 and protects.

The first and second protective covers 12a and 12b are preferably formed from a resin. In the present embodiment, the protective covers are formed from a thermoplastic elastomer and have predetermined rubber-like elasticity such that the portions are bent when pressed by an operator. Although various thermoplastic elastomers can be used, it is preferable to use olefins (TPO), and a combination of polypropylene and EPDM is a preferred example thereof. By using the protective cover 12 formed from such a thermoplastic elastomer, the cover can be appropriately used in a wide range of temperatures (for example, −35° C. to 80° C.) under which the vehicle V is used. Moreover, it is possible to easily form a first hook portion 60a or a second hook portion 60b described later. The material of the first and second protective covers 12a and 12b is not limited to the thermoplastic elastomer but other relatively soft resin materials can be also used.

As illustrated in FIG. 1, the first protective cover 12a includes a protective portion 20a that protects the airbag 10 in the folded state and a tab-shaped base portion 22a that is extended upward from the protective portion 20a. As illustrated in FIG. 1, the base portion 22a is disposed in a region (above the protective portion 20a) in which the airbag 10 is not deployed, and an insertion portion 24a that is inserted into an attachment hole 5a formed in the vehicle V protrudes from one surface Sa of the base portion 22a. The insertion portion 24a is a cylindrical portion and locking portions 25a and 26a that are detachably locked at the vehicle V are formed in upper and lower portions of the insertion portion 24a, respectively.

The protective portion 20a is a portion that stores and protects the airbag 10 so that the airbag 10 is not damaged by making contact with the body of the vehicle H such as the roof side rail 2. As illustrated in FIG. 1, the protective portion 20a generally has an approximately C-shaped cross-sectional shape, and this cross-sectional shape includes a curved wall portion 40a and a linear upper vertical wall portion 42a and a linear lower vertical wall portion 44a extending from both ends of the curved wall portion 40a. In a state where the first protective cover 12a is attached to the vehicle V, the protective portion 20a is positioned so that an opening of the approximately C-shaped cross-section faces the vehicle interior side in an obliquely downward direction. Thus, the airbag 10 that is stored in the protective portion 20a in the folded state is deployed toward the vehicle interior side in an obliquely downward direction.

The upper vertical wall portion 42a is formed to be connected to an upper end P1a on the vehicle interior side of the curved wall portion 40a and the lower vertical wall portion 44a is formed to be connected to a lower end P2a on the vehicle exterior side of the curved wall portion 40a. That is, the upper vertical wall portion 42a is extended from the upper end P1a of the curved wall portion 40a and the lower vertical wall portion 44a is extended from the lower end P2a of the curved wall portion 40a. An inner surface 441a of the lower vertical wall portion 44a is a surface disposed close to the center of curvature of the curved wall portion 40a and guides the airbag 10 being deployed. Moreover, the lower vertical wall portion 44a has an extension portion 46a that is disposed in a lower end P3a on a side opposite to the curved wall portion 40a so as to extend toward the vehicle exterior side. The extension portion 46a extends toward a side opposite to the airbag 10, and at least a portion in the longitudinal direction of the extension portion 46a will collide with a weather strip (not illustrated) on the vehicle V side during the deployment of the airbag 10.

Since the cross-sectional shape of the second protective cover 12b is approximately the same as the cross-sectional shape of the first protective cover 12a described above, detailed description thereof will not be provided. In the following description, a part of the second protective cover 12b corresponding to the upper vertical wall portion 42a of the first protective cover 12a will be referred to as an upper vertical wall portion 42b. Similarly to the first protective cover 12a, the second protective cover 12b is fixed to the inner panel 4 of the vehicle V in a state where an opening of the cross-section of the protective portion 20b faces the vehicle interior side in an obliquely downward direction.

Figure 2:
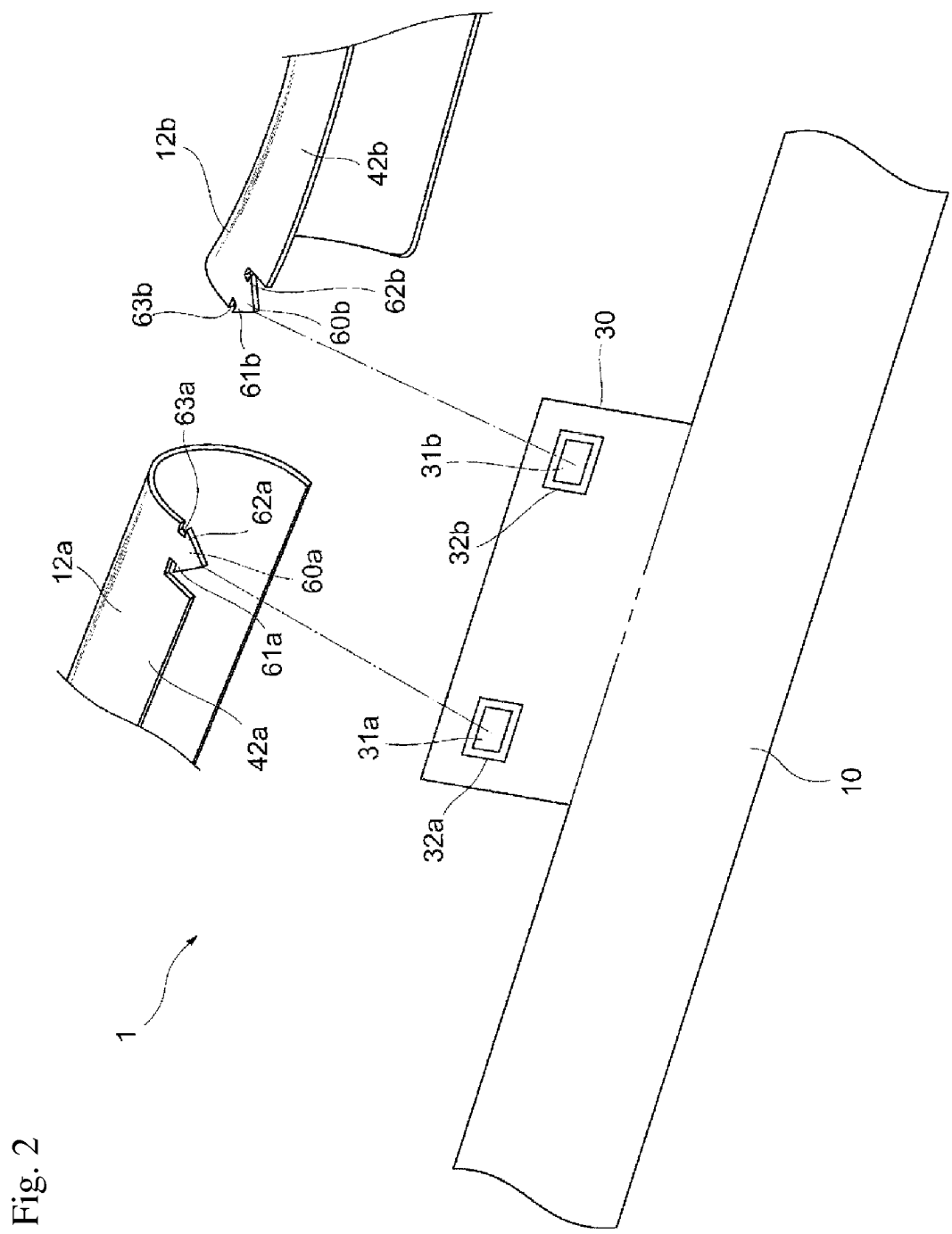
FIG. 2 is a diagram showing a configuration of a connecting portion of protective covers in the airbag device illustrated in FIG. 1.
Figure 3:
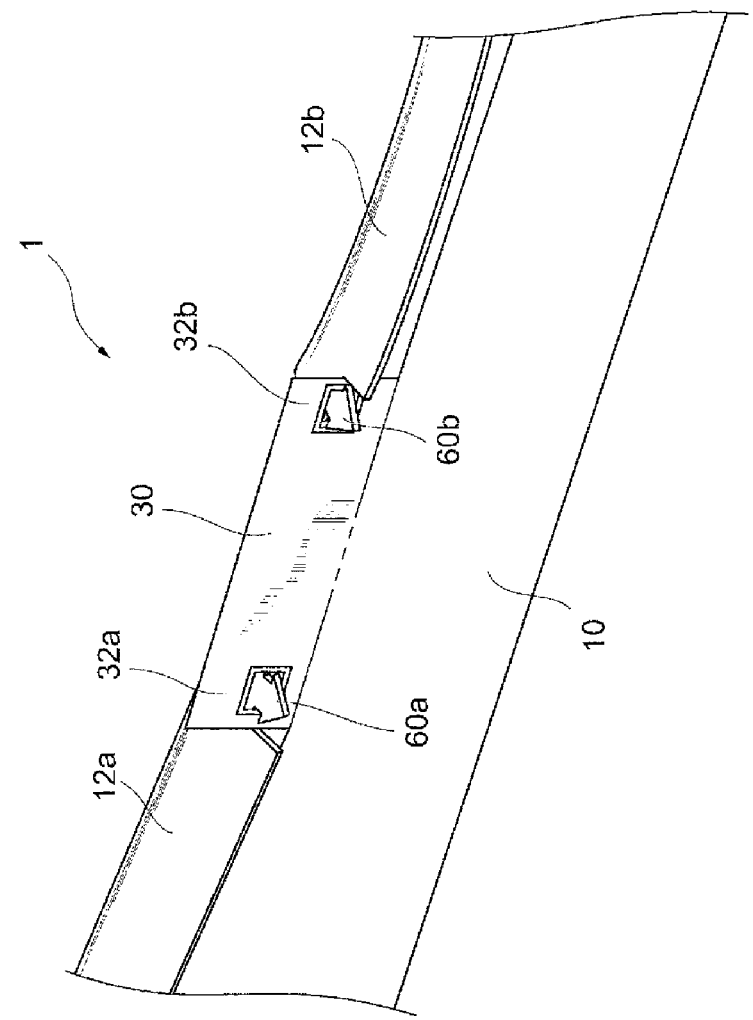
FIG. 3 is a diagram showing a configuration of a connecting portion of protective covers in the airbag device illustrated in FIG. 1.

Next, the configuration of a connecting portion of the first and second protective covers 12a and 12b will be described with reference to FIGS. 2 and 3. FIGS. 2 and 3 are diagrams for describing the configuration of the connecting portion of the protective cover 12. FIG. 2 illustrates a state where the first and second protective covers 12a and 12b and the airbag 10 are disassembled (the state before the protective covers 12a and 12b and the airbag 10 are connected), and FIG. 3 illustrates a state where these components are connected.

As illustrated in FIG. 2, a tab 30 is formed in a part of an outer surface of the airbag 10 that is stored in the first and second protective covers 12a and 12b in the folded state. The tab 30 is a piece of rectangular woven fabric formed from the same material as the airbag 10, and one of the long sides thereof is sewn to the outer surface of the airbag 10. The tab 30 is disposed so as to protrude toward the outer side of the folded airbag 10 so that a longitudinal direction thereof is approximately in parallel with the longitudinal direction of the airbag 10.

A first insertion hole 31a and a second insertion hole 31b are formed so as to penetrate through portions of the tab 30 near both ends in the longitudinal direction. The first and second insertion holes 31a and 31b are penetration holes formed in a rectangular shape and are formed at positions that are approximately at the same distance from the portions of the tab 30 sewn to the airbag 10.

A rectangular first frame 32a formed from a resin is fixed to an edge of the first insertion hole 31a. Moreover, a rectangular second frame 32b formed from a resin is fixed to an edge of the second insertion hole 31b. The first and second frames 32a and 32b are frames having the same shape and are provided so as to maintain the shape of the first and second insertion holes 31a and 31b that are formed in the tab 30 which is a piece of woven fabric.

The first hook portion 60a is formed in an end of the first protective cover 12a close to the second protective cover 12b. As illustrated in FIG. 2, the first hook portion 60a is formed as a planar projection which is formed by notching a part of the upper vertical wall portion 42a and which protrudes toward the vehicle interior side. The first hook portion 60a includes a parallel portion 63a which is a portion extending from the curved wall portion 40a and which is formed in an approximately rectangular shape in a top view. Locking portions 61a and 62a having a larger width than the parallel portion 63a are formed in portions of the first hook portion 60a located closer to the vehicle interior side than the parallel portion 63a in the longitudinal direction of the airbag 10.

Here, the width of the parallel portion 63a in the longitudinal direction of the airbag 10 is smaller than an inside dimension in the longitudinal direction of the first frame 32a. On the other hand, the width (the distance from a distal end of the locking portion 61a to a distal end of the locking portion 62a) of the locking portions 61a and 62a in the longitudinal direction of the airbag 10 is slightly larger than the inside dimension in the longitudinal direction of the first frame 32a.

The first hook portion 60a is formed such that the width thereof decreases as the first hook portion 60a advances further toward the vehicle interior side than the locking portions 61a and 62a, and a distal end close to the vehicle interior side is sharp. Thus, as illustrated in FIG. 2, the first hook portion 60a has an arrow shape in a top view.

A second hook portion 60b is formed in an end of the second protective cover 12b close to the first protective cover 12a. As illustrated in FIG. 2, the second hook portion 60b is formed as a planar projection which is formed by notching a part of the upper vertical wall portion 42b and which protrudes toward the vehicle interior side. The second hook portion 60b includes a parallel portion 63b which is a portion extending from the curved wall portion 40b and which is formed in an approximately rectangular shape in a top view. Locking portions 61b and 62b having a larger width than the parallel portion 63b are formed in portions of the second hook portion 60b located closer to the vehicle interior side than the parallel portion 63b in the longitudinal direction of the airbag 10.

Here, the width of the parallel portion 63b in the longitudinal direction of the airbag 10 is smaller than an inside dimension in the longitudinal direction of the second frame 32b. On the other hand, the width (the distance from a distal end of the locking portion 61b to a distal end of the locking portion 62b) of the locking portions 61b and 62b in the longitudinal direction of the airbag 10 is slightly larger than the inside dimension in the longitudinal direction of the second frame 32b.

The second hook portion 60b is formed such that the width thereof decreases as the second hook portion 60b advances further toward the vehicle interior side than the locking portions 61b and 62b, and a distal end close to the vehicle interior side is sharp. Thus, as illustrated in FIG. 2, the second hook portion 60b has an arrow shape in a top view.

As illustrated in FIG. 3, in the airbag device 1 according to the present embodiment, the first hook portion 60a is inserted into the first insertion hole 31a (the first frame 32a) of the tab 30, whereby the first protective cover 12a and the tab 30 are connected. The first hook portion 60a has the parallel portion 63a which is inserted into the first insertion hole 31a. The locking portions 61a and 62a are locked at the first frame 32a, whereby the first hook portion 60a is prevented from being easily removed from the first insertion hole 31a.

Similarly, the second hook portion 60b is inserted into the second insertion hole 31b (the second frame 32b) of the tab 30, whereby the second protective cover 12b and the tab 30 are connected. The second hook portion 60b has the parallel portion 63b which is inserted into the second insertion hole 31b. The locking portions 61b and 62b are locked at the second frame 32b, whereby the second hook portion 60b is prevented from being easily removed from the second insertion hole 31b.

As described above, in the airbag device 1, the first and second protective covers 12a and 12b which are adjacent to each other in the longitudinal direction of the airbag 10 are not connected directly to each other but are connected by the tab 30 formed in a part of the airbag 10. In the state illustrated in FIG. 3, when trying to rotate (twist) only one of the first and second protective covers 12a and 12b about the longitudinal direction of the airbag 10, both ends of the tab 30 are stretched, whereby rotation is suppressed.

Moreover, when trying to rotate the protective cover excessively, since the direction of the tab 30 is not approximately in parallel with the longitudinal direction of the airbag 10, it is possible to easily perceive from the outside that the airbag 10 is twisted therein. Due to this, it is possible to reliably prevent the first and second protective covers 12a and 12b from being attached to the vehicle V in a state where the airbag 10 is twisted.

Figure 4:
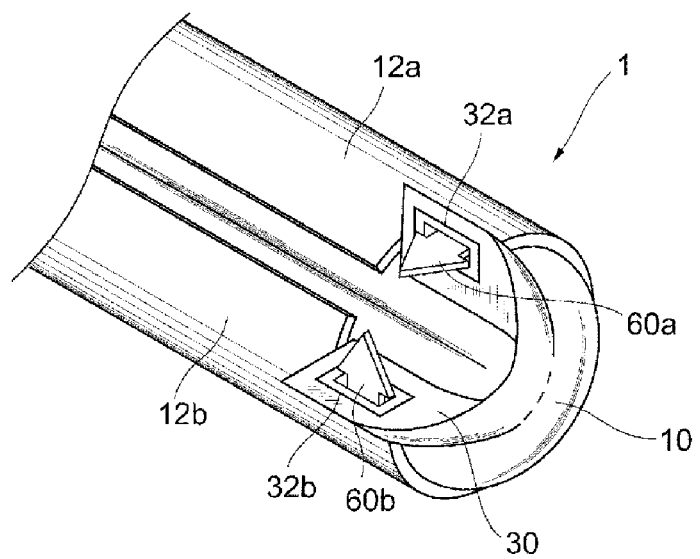
FIG. 4 is a diagram illustrating a state where the airbag device illustrated in FIG. 1 is bent at the connecting portion of the protective covers.

On the other hand, since the tab 30 disposed between the first and second protective covers 12a and 12b so as to connect both is made from a soft woven fabric, the tab 30 can be freely deformed. Thus, during transportation or the like before the airbag device 1 is attached to the vehicle V, as illustrated in FIG. 4, the connecting portion of the first and second protective covers 12a and 12b can be bent.

In a state where the tab 30 is not bent but is stretched along a flat surface, the distance between the first and second insertion holes 31a and 31b of the tab 30 is approximately the same as the distance between the first and second hook portions 60a and 60b in a state (that is, the state illustrated in FIG. 3) where the airbag device 1 is attached to the vehicle V. Thus, in a state where the airbag device 1 is attached to the vehicle V, deflection (deflection along the longitudinal direction of the airbag 10) may not occur in the tab 30 of which both ends are connected to the first and second hook portions 60a and 60b. As a result, it is impossible to attach the airbag device 1 to the vehicle V in a state where only one of the first and second protective covers 12a and 12b is rotated about the longitudinal direction of the airbag (the state where the airbag 10 is twisted). Due to this, it is possible to reliably prevent the first and second protective covers 12a and 12b from being attached to the vehicle V in a state where the airbag 10 is twisted.

Hereinabove, the embodiment of the present invention has been described with reference to specific examples. However, the present invention is not limited to these specific examples. That is, a person skilled in the art can add design changes to any of these specific examples as appropriate, and such changes also fall within the scope of the present invention as long as the changes retain the features of the present invention. For example, the constituent components included in any of the above-described specific examples, the layouts, materials, conditions, shapes, sizes, and the like of the components are not limited only to those specified in the examples but can be changed as appropriate. In addition, any components included in the above-described embodiment can be used in combination as long as such combinations are technically feasible. Such combinations also fall within by the scope of the present invention as long as such combinations retain the features of the present invention.

What is claimed is:

1. An airbag device configured for attachment to a roof side rail of a vehicle, the airbag device comprising:
   an airbag folded in a long and thin manner and defining a longitudinal direction;
   a first protective cover that stores a first part of the airbag; and
   a second protective cover arranged so as to be disposed in line with the first protective cover in a longitudinal direction of the airbag, the second protective cover storing a second part of the airbag, wherein
   the airbag including a tab formed in an area between the first and second protective covers, the tab protruding outward from the airbag and having a length extending in the longitudinal direction of the airbag, and
   the tab having one end connected to the first protective cover and another end connected to the second protective cover.

2. The airbag device according to claim 1, wherein
   a first hook portion formed in an end of the first protective cover located toward the tab,
   a second hook portion formed in an end of the second protective cover located toward the tab,
   wherein the tab is connected to the first protective cover by the first hook portion being inserted into a first insertion hole formed in one end of the tab, and
   the tab is connected to the second protective cover by the second hook portion being inserted into a second insertion hole formed in the other end of the tab.

3. The airbag device according to claim 2, wherein a distance between the first and second insertion holes of the tab is approximately the same as a distance between the first and second hook portions in a state where the airbag device is attached to the roof side rail of the vehicle.

4. The airbag device according to claim 1, wherein the first and second protective covers are made from a resin.

5. The airbag device according to claim 1, wherein the tab is a fabric and one side of the tab is sewn to the airbag.

6. The airbag device according to claim 5, wherein a first frame is attached to an edge of the first insertion hole and a second frame is attached to an edge of the second insertion hole.

7. The airbag device according to claim 1, wherein a first connecting portion is formed in an end of the first protective cover located toward the tab, a second connecting portion is formed in an end of the second protective cover located toward the tab, the tab being connected to the first protective cover by the first connecting portion, and the tab being connected to the second protective cover by the second connecting portion.

8. The airbag device according to claim 7, wherein the first connecting portion is inserted into a first insertion hole formed in one end of the tab to attach the first protective cover to the tab.

9. The airbag device according to claim 8, wherein the second connecting portion is inserted into a second insertion hole formed in the other end of the tab to attach the second protective cover to the tab.

10. The airbag device according to claim 7, wherein the second connecting portion is inserted into a second insertion hole formed in the other end of the tab to attach the second protective cover to the tab.

11. The airbag device according to claim 7, wherein a distance between the first and second insertion holes of the tab is generally the same as a distance between the first and second connecting portions in a state where the airbag device is attached to the roof side rail of the vehicle.

12. The airbag device according to claim 7, wherein the tab is formed of fabric and one side of the tab is attached to the airbag.

13. The airbag device according to claim 7, wherein the tab is formed of fabric and one side of the tab is sewn to the airbag.

14. The airbag device according to claim 7, wherein the airbag is formed of a fabric and the tab is formed of the same fabric as the airbag.

15. The airbag device according to claim 7, wherein the tab includes first and second insertion holes into which the first and second connecting portions are respectively inserted, and a first frame is provided about an edge of the first insertion hole rigidifying the first insertion hole and a second frame is provided about an edge of the second insertion hole rigidifying the second insertion hole.

16. The airbag device according to claim 7, wherein the airbag is folded upon itself in the area of the tab.

17. The airbag device according to claim 16, wherein the first and second protective covers are located adjacent to one another when the airbag is folded upon itself.

* * * * *